(12) United States Patent
Ozawa et al.

(10) Patent No.: US 9,871,367 B2
(45) Date of Patent: Jan. 16, 2018

(54) OVERCURRENT PROTECTION CIRCUIT

(71) Applicants: ANDEN CO., LTD, Anjo, Aichi-pref. (JP); TOYOTA JIDOSHA KABUSHIKI KAISHA, Toyota-shi, Aichi-ken (JP)

(72) Inventors: Kazunori Ozawa, Anjo (JP); Fukuo Ishikawa, Anjo (JP); Shinji Oshita, Toyota (JP); Kenichi Takayoshi, Nisshin (JP)

(73) Assignees: ANDEN CO., LTD., Anjo, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/382,768

(22) Filed: Dec. 19, 2016

(65) Prior Publication Data

US 2017/0187319 A1    Jun. 29, 2017

(30) Foreign Application Priority Data

Dec. 25, 2015   (JP) .................................. 2015-254265

(51) Int. Cl.
 *H02P 1/04* (2006.01)
 *H02P 3/00* (2006.01)
 (Continued)

(52) U.S. Cl.
 CPC .......... *H02H 3/066* (2013.01); *H02H 3/0935* (2013.01)

(58) Field of Classification Search
 CPC .... H02P 6/185; H02P 6/21; H02P 6/22; H02P 3/12; H02P 3/22
 (Continued)

(56) References Cited

U.S. PATENT DOCUMENTS 6,683,799 B2 * 1/2004 Kato .................... H02H 7/1225
                                                363/132
7,136,269 B2 * 11/2006 Iimura .................. H02H 3/006
                                                361/93.7

(Continued)

FOREIGN PATENT DOCUMENTS

JP    2013-085443 A    5/2013
JP    5482055 B2    4/2014

*Primary Examiner* — Paul Ip
(74) *Attorney, Agent, or Firm* — Harness, Dickey & Pierce, P.L.C.

(57) ABSTRACT

An overcurrent protection circuit includes a load drive portion that drives a load based on a power supply voltage; a wire that connects the load and the load drive portion; a current detection portion that detects a load current showing a value of a current flowing through the load; a voltage detection portion; and a controller that controls the load drive portion to control a drive of the load, the controller determining an addition-and-subtraction value, controlling the load drive portion to cut off the load current, and stopping driving the load to protect a protection target from an overcurrent. The controller subtracts the integration value based on an elapsed time after cutoff of the load current. The controller controls the load drive portion to again start to drive the load, and also calculates a post-correction integration value lower than a pre-correction integration value by correcting the pre-correction integration value.

10 Claims, 7 Drawing Sheets

(51) Int. Cl.
*H02H 3/06* (2006.01)
*H02H 3/093* (2006.01)

(58) Field of Classification Search
USPC .... 318/476, 400.01, 400.1; 351/24, 82, 93.1
See application file for complete search history.

(56) References Cited

U.S. PATENT DOCUMENTS

| | | | | |
|---|---|---|---|---|
| 7,847,498 B2* | 12/2010 | Shibuya | ............... | H02P 6/185 318/400.01 |
| 2003/0080772 A1* | 5/2003 | Giacomini | ......... | B60R 16/0239 324/765.01 |
| 2003/0117753 A1* | 6/2003 | Kato | ............... | H02H 7/1225 361/18 |
| 2003/0227730 A1* | 12/2003 | Iimura | ............... | H02H 3/006 361/93.1 |
| 2008/0048598 A1* | 2/2008 | Shibuya | ............... | H02P 6/185 318/400.1 |
| 2011/0157752 A1* | 6/2011 | Sakanobe | ............ | H02H 3/006 361/18 |
| 2012/0153719 A1* | 6/2012 | Inaba | ............... | B60L 3/003 307/10.1 |
| 2012/0170166 A1* | 7/2012 | Nagasawa | ............... | H02H 3/07 361/92 |
| 2012/0176115 A1 | 7/2012 | Higuchi et al. | | |
| 2013/0063850 A1* | 3/2013 | Kawamoto | ............ | H02H 3/08 361/87 |
| 2014/0313621 A1* | 10/2014 | Innes | ............... | H02P 3/12 361/24 |

* cited by examiner

OVERCURRENT PROTECTION CIRCUIT

CROSS REFERENCE TO RELATED APPLICATION

This application is based on Japanese Patent Application No. 2015-254265 filed on Dec. 25, 2015, the disclosure of which is incorporated herein by reference.

TECHNICAL FIELD

The present disclosure relates to an overcurrent protection circuit that protects a protection target from overcurrent. The protection target includes a wire connected to a load.

BACKGROUND

Patent literature 1: JP 5482055 B (corresponding to US 2012/0176115 A1)
Patent literature 2: JP 2013-85443 A (corresponding to US 2013/0063850 A1)

For example, patent literature 1 and patent literature 2 each describes an overcurrent protection circuit that protects a protection target from overcurrent. The overcurrent protection circuit detects current flowing through a semiconductor switch for switching current supply to a load. Based on the detected current, the overcurrent protection circuit turns off the semiconductor switch when overcurrent has been detected, so that, for example, a wire is protected from fuming (or smoking). Specifically, a sense current is obtained by reducing a current flowing through the semiconductor switch at a predetermined ratio. The sense current is converted to voltage with an I-V conversion circuit, and an AD converter (an analog-to-digital converter) converts voltage being an analog value after conversion to a digital value. A controller such as a microcomputer determines an addition value corresponding to the digital value. The controller cuts off current by turning off the semiconductor switch in a case when an integration value of the addition value exceeds a determination threshold.

SUMMARY

It is an object of the present disclosure to provide an overcurrent protection circuit that prevents a load from immediately stopping when the load is driven again.

According to one aspect of the present disclosure, an overcurrent protection circuit includes: a load drive portion that drives a load based on a power supply voltage; a wire that connects the load and the load drive portion; a current detection portion that detects a load current showing a value of a current flowing through the load, and outputs a sense voltage corresponding to the load current; a voltage detection portion that detects the power supply voltage; and a controller that controls the load drive portion to control a drive of the load, the controller determining an addition-and-subtraction value based on the sense voltage detected by the current detection portion, controlling the load drive portion to cut off the load current when an integration value obtained by adding and subtracting with the addition-and-subtraction value exceeds a determination threshold, and stopping driving the load to protect a protection target from an overcurrent, The controller subtracts the integration value based on an elapsed time after cutoff of the load current when detecting decrease of the power supply voltage and cutting off the load current due to excess of the integration value over the determination threshold. The controller, when the power supply voltage increases to a predetermined voltage after the power supply voltage decreases, controls the load drive portion to again start to drive the load, and also calculates a post-correction integration value lower than a pre-correction integration value by correcting the pre-correction integration value, which is the integration value after subtraction. The controller adds and subtracts from the post-correction integration value.

Accordingly, a post-correction integration value is set, the post-correction integration value being a smaller value than a pre-correction integration value. Incidentally, the pre-correction integration value corresponds to an integration value obtained by subtracting a subtraction value corresponding to time after cutting off the load current. Since the post-correction integration value is reduced to a value prospecting the addition value corresponding to the rush current, it may be possible to prevent the integration value from exceeding a determination threshold when the addition value is added due to the occurrence of the rush current at the time of re-drive of the load. Thus, it may be possible to prevent the load current from being falsely cut off due to the rush current. It may be possible to prevent a load from immediately stopping when the load is driven again.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The inventors of the present application have found the following. Due to decrease of power supply voltage to an overcurrent protection circuit, detection accuracy when a microcomputer detects voltage shown by an AD converter may get worse.

For example, an overcurrent protection circuit for vehicle utilizes a battery as a power source. A power supply circuit in the overcurrent protection circuit generates a power supply voltage for a microcomputer (hereinafter, referred to as a microcomputer power supply voltage) and a reference voltage for reading the voltage of the AD converter, based on the power supply voltage (that is, a battery voltage). As illustrated in the variation of the microcomputer power supply voltage with respect to the power supply voltage illustrated in FIG. 9, the microcomputer power supply voltage is made a constant value when the power supply voltage is equal to or greater than 6.5 V, for example. However, the microcomputer power supply voltage may decrease in accordance with decrease of the power supply voltage when the power supply voltage is equal to or less than 6.5 V. Similarly, the reference voltage may decrease in accordance with the decrease of the power supply voltage. Although voltage drop when the microcomputer supply voltage decreases has an error according to a manufacture error or the like, in a typical product, the voltage drop may occur from 6 V or less (hereinafter, referred to as a voltage drop "typ" case). Incidentally, when the voltage drop occurs, the microcomputer power supply voltage decreases. Similarly, the voltage drop may occur in some cases when the power supply voltage is relatively large, that is, from the earliest time (hereinafter, a voltage drop "max" case). The voltage drop may occur in some cases when the power supply voltage is relatively small, that is, from the slowest time (hereinafter, referred to as a voltage drop "min" case).

Figure 10:
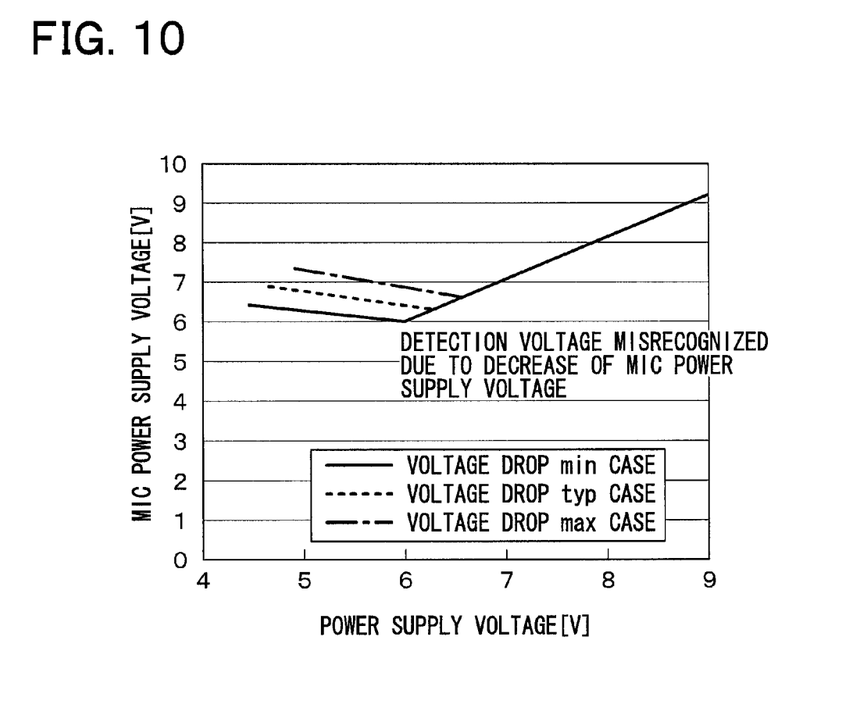
FIG. 10 is a diagram illustrating the change of the microcomputer recognition voltage for the power supply voltage.

Also, due to the decrease of the microcomputer power supply voltage, more specifically, due to the decrease of the reference voltage, as illustrated in FIG. 10, the microcomputer may falsely recognize voltage value inputted from the AD converter, and may recognize the voltage value as a higher value than the actual inputted voltage value. This kind of misrecognition may occur in the voltage drop "max" case and the voltage drop "min" case, in addition to the voltage drop "typ" case.

Figure 11:
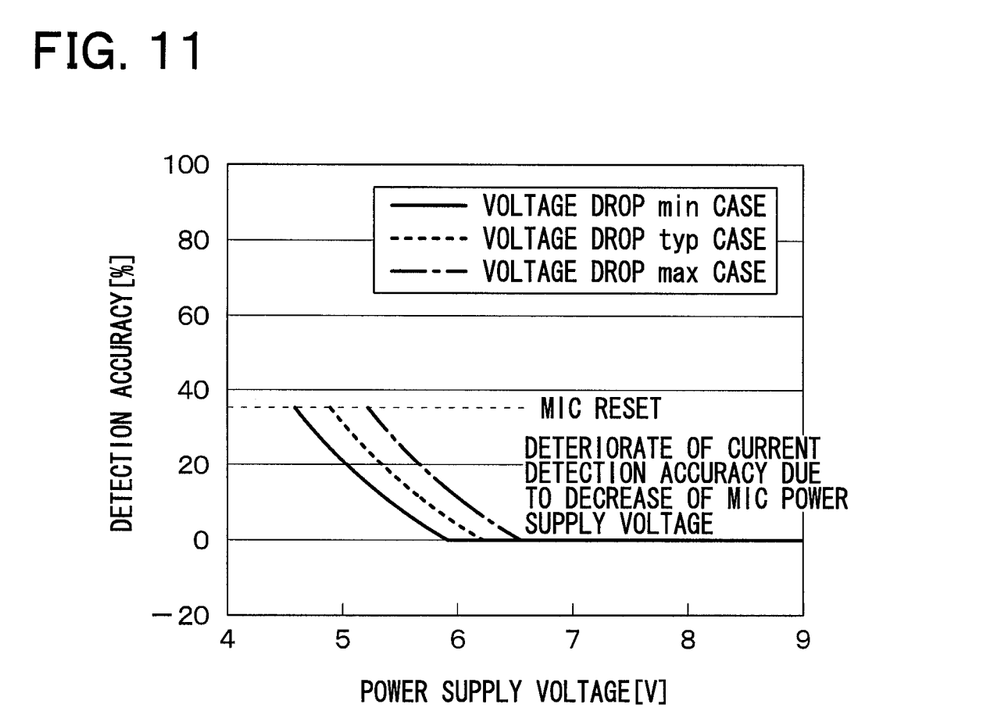
FIG. 11 is a diagram illustrating the change of a current (voltage) detection accuracy for the power supply voltage.

FIG. 11 shows detection accuracy regarding this kind of misrecognition. As illustrated in FIG. 11, there is a shift of about 40% at most between the detected voltage value and the actual voltage value.

It is supposed that the detection accuracy gets worse. In this case, it may be determined that the sense current is an abnormal current deviating from a normal current value range even though the sense current is a normal current that is included within the normal current value range. In this case, the addition value may be added, unnecessarily, and a semiconductor switch may be turned off, so that the load current may be cut off. Conventionally, in order to prevent the load current from falsely being cut off based on a deterioration of the detection accuracy, the load current is cut off when the detection accuracy gets worse (or is deteriorated), and the load is not driven when misrecognition may occur.

Recently, the drive of the load may be required even at a low voltage as much as possible even though the power supply voltage is decreased. When the load is not driven within a range where the detection accuracy may be deteriorated, the above requirement is not satisfied.

In order to satisfy the above requirement, a large capacity capacitor may be added between a power supply and a ground voltage point (hereinafter, referred to as GND), or a power supply circuit may be configured by a voltage boost power circuit such as a DC-DC converter. However, an additional capacitor may be required, or an element for configuring a voltage boost power supply circuit may be required. Thus, an overcurrent protection circuit may become complicated, a size of a product may enlarge according to this complication, and a cost may increase.

On the other hand, supposing that the detection accuracy is deteriorated, the drive of the load may maintain even when the power supply voltage is decreased to some extent. In this case, the addition value is added even when the sense current is the normal current, and the drive of the load may be stopped by cutting off the load current. Basically, the drive of the load maintains until the microcomputer voltage becomes lower than a reset voltage, which corresponds to an operation limit of the microcomputer. Accordingly, until the microcomputer voltage becomes less than the microcomputer reset voltage or until the integration value of the addition value exceeds a determination threshold, the drive of the load maintains, so that the above requirement may be satisfied. However, according to this drive method, the detection accuracy is deteriorated and, when occurrence of the overcurrent is detected to cut off the load current, it may be unclear whether the overcurrent has occurred truly or the power supply voltage has been lowered and it has been falsely determined that the overcurrent occurs.

It is supposed that the load current is cut off and the drive of the load is stopped. In this case, when the cut off of the load current has occurred due to low voltage of the power supply voltage instead of actual occurrence of the overcurrent, the semiconductor switch turns on again to redrive the load when the power supply voltage returns to a high voltage to some extent. When the semiconductor switch turns on again in the above case, temperature of the protection target such as a wire decreases in accordance with an elapsed time after cutting off the load current. Thus, the integration value of the addition value is reduced in accordance with the elapsed time to obtain the integration value corresponding to temperature decrease of the wire.

It is supposed that rush current occurs when the load is redriven (that is, driven again). In this case, the addition value is integrated at the time of the occurrence of the rush current, and the addition value at the occurrence of the rush current is added to the integration value corresponding to the temperature decrease of the wire, so that the integration value may immediately exceed the determination threshold. Thus, the load is not driven although the load can be actually driven.

When the microcomputer voltage becomes the microcomputer reset voltage or less, the integration value of the addition value is reset to zero. Thus, when the overcurrent has occurred actually, and the semiconductor switch turns on again after the power supply voltage returns to a high voltage to some extent, the integration value is added from zero again and the load current is not cut off until the integration value exceeds the determination threshold. Thus, during this period of time, the overcurrent keeps flowing. Thus, the protection target may not be protected from overcurrent sufficiently.

Hereinafter, embodiments of the present disclosure will be explained with reference to the drawings. Incidentally, the identical or similar parts in each embodiment will be added to the identical numerals.

First Embodiment

A first embodiment of the present disclosure will be explained. In the present embodiment, an overcurrent detection circuit that has a wire (also referred to as a wire harness) as a protection target, that is, an overcurrent protection circuit that prevents a wire from fuming (smoking) due to flow of the overcurrent will be explained, for an example. The overcurrent protection circuit protecting the wire corresponds to one example of the present disclosure.

Figure 1:
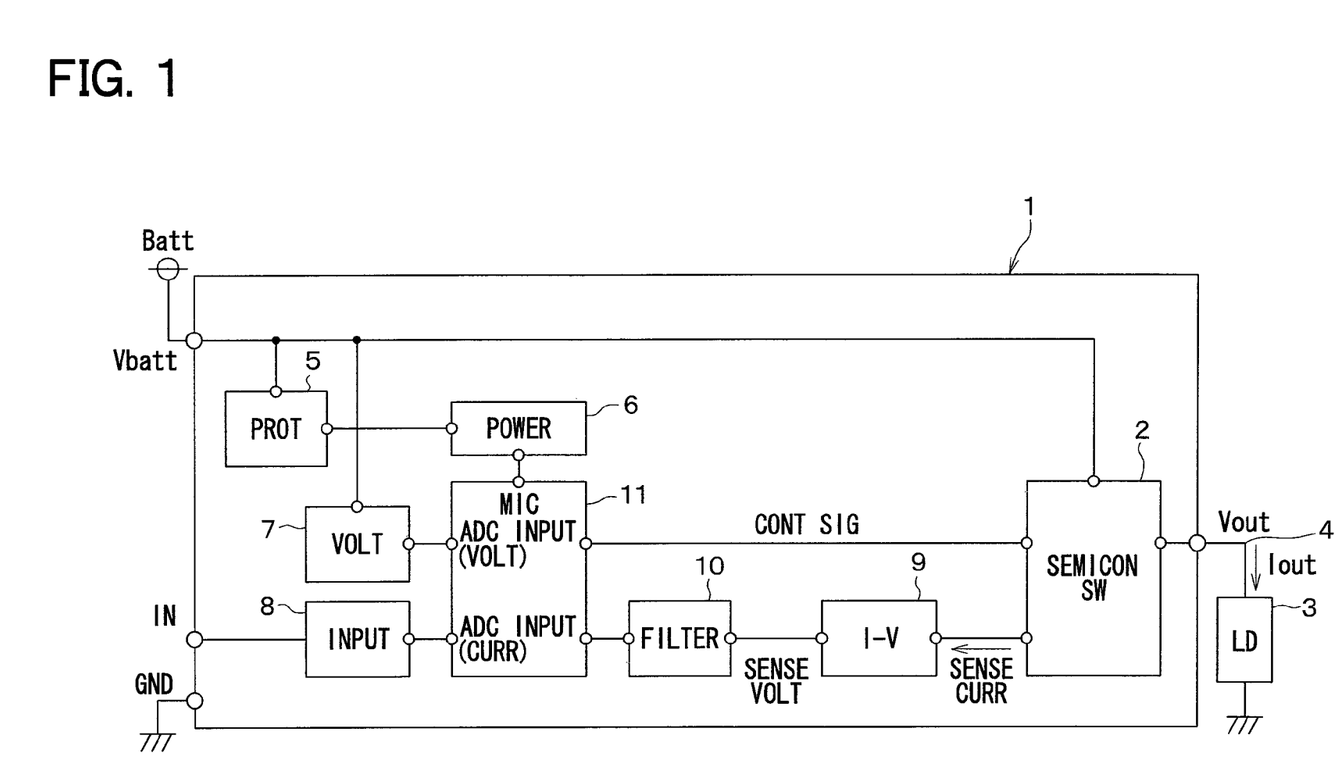
FIG. 1 is a block diagram illustrating an overcurrent protection circuit according to a first embodiment.

An overcurrent protection circuit illustrated in the present embodiment is mounted to, for example, a vehicle. The overcurrent protection circuit functions as a power supply apparatus that supplies power to a load connected with the wire. The overcurrent protection circuit detects overcurrent flowing through the wire, and protects the load. FIG. 1 illustrates a block configuration of an overcurrent protection circuit 1 according to the present embodiment. Hereafter, with reference to FIG. 1, the overcurrent protection circuit 1 according to the present embodiment will be explained.

As illustrated in FIG. 1, the overcurrent protection circuit 1 controls a semiconductor switch 2 so as to control current supply to a load 3 from a power supply Batt such as a battery, and the overcurrent protection circuit 1 drives the load 3. The overcurrent protection circuit 1 detects that a load current Iout becomes overcurrent, controls the semiconductor switch 2 to cut off the load current Iout, and protects the wire 4 from the overcurrent. The wire 4 supplies current to the load 3. The overcurrent protection circuit 1 has a protection circuit 5, a power supply circuit 6, a voltage detection circuit 7, an input circuit 8, an I-V conversion circuit 9, a filter circuit 10, and a microcomputer 11, in addition to the semiconductor switch 2. The I-V conversion circuit may be also referred to as a current/voltage conversion circuit. The I-V conversion circuit 9 corresponds to a current detection portion or a current detector. The voltage detection circuit 7 corresponds to a voltage detection portion or a voltage detector. The microcomputer 11 corresponds to a controller.

The semiconductor switch 2 corresponds to a load drive portion. The semiconductor switch 2 is connected to a high side of the load 3 as illustrated in FIG. 1. The semiconductor switch 2 is configured from a semiconductor switching element. The semiconductor switching element may be a power MOSFET (metal oxide semiconductor field effect transistor), IGBT (insulated gate bipolar transistor), or a bipolar transistor, for example. The semiconductor switch 2 is controlled based on a control signal received from the microcomputer 11. The load current Iout is supplied to the load 3 when the semiconductor switch turns on, so that the load is driven.

The semiconductor switch 2 outputs a sense current that corresponds to a current obtained by decreasing the load current Iout by a predetermined ratio. The sense current is transmitted to the I-V conversion circuit 9. For example, it is supposed that the semiconductor switch 2 is an n-type MOSFET. In this case, a drain of the semiconductor switch 2 is connected to the power supply Batt, and a source of the semiconductor switch 2 is connected to the load 3. The control signal from the microcomputer 11 is transmitted to a gate of the semiconductor switch 2. By dividing the MOSFET in a chip by a predetermined area ratio, a part where the load current flows and another part where the sense current flows are provided. By connecting the divided MOSFETs in a current mirror connection, the sense current that corresponds to a value reduced by a predetermined ratio with respect to the load current Iout is obtained.

The protection circuit 5 includes a general circuit for protection such as an overvoltage protection circuit which prevents overvoltage from being applied to a microcomputer, a reverse connection protection circuit which prevents a reversed voltage from being applied to a microcomputer when a positive and negative polarity of a battery is connected reversely.

Figure 9:
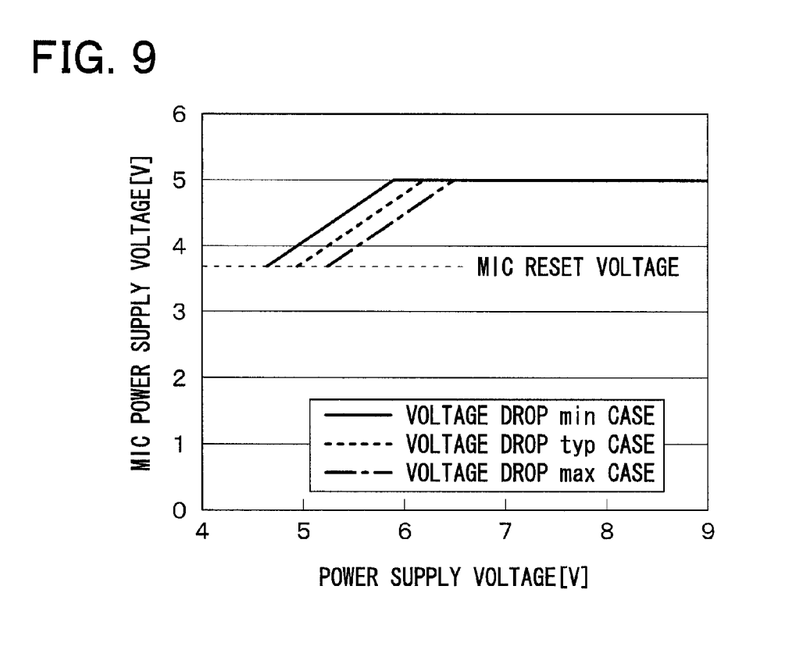
FIG. 9 is a diagram illustrating a change of the microcomputer power supply voltage for the power supply voltage.

The power supply circuit 6 generates a microcomputer power supply voltage that corresponds to drive voltage of the microcomputer 11 and generates reference voltage that is used by the microcomputer 11. The power supply circuit 6 can generates the microcomputer supply voltage and the reference voltage at intended voltage values when the power supply voltage Vbatt is equal or larger than a predetermined voltage (for example, 6.5 V). On the other hand, the power supply circuit 6 cannot generate the microcomputer power supply voltage and the reference voltage at intended voltages when the power supply voltage Vbatt is less than the predetermined voltage. According to manufacturing error or the like, a voltage value at the power supply voltage Vbatt when the microcomputer power supply voltage or the reference voltage begins to reduce may be different. In any case, the microcomputer power supply voltage and the reference voltage are reduced in a substantially similar manner (as illustrated in FIG. 9).

The voltage detection circuit 7 detects a voltage value (or, also referred to as voltage, for simplicity) of the power supply voltage Vbatt, and transmits a detection result to the microcomputer 11. For example, the voltage detection circuit 7 divides voltage of the power supply voltage Vbatt, and transmits the voltage value as the detection result after converting to a value readable for the microcomputer 11.

The input circuit 8 receives a signal showing a drive request of the load 3 from a user or another electronic control unit (ECU), and inputs a signal corresponding to the drive request to the microcomputer 11. The signal showing the drive request of the load 3 is, for example, a signal showing a depression of an operation switch performed by a user.

The I-V conversion circuit 9 converts the sense current transmitted from the semiconductor switch 2, and outputs voltage to the filter circuit 10. Hereinafter, the voltage after the voltage conversion is referred to as sense voltage.

The filter circuit 10 includes, for example, a CR circuit. The filter circuit 10 removes a noise component in the sense voltage such as a high frequency noise, and transmits the sense voltage after removing the noise component to the microcomputer 11.

The microcomputer 11 controls the semiconductor switch 2 based on a signal from the input circuit 8 and drives the load 3. However, in a case where the load current Iout enlarges and the overcurrent occurs, the microcomputer 11 may not protect the protection target. For example, when the overcurrent flows, the wire 4 may fume and burn out. Thus, it may be necessary to protect the protection target, such as the wire 4, from the overcurrent.

Thus, the microcomputer 11 drives the load 3 based on the signal of the input circuit 8 basically, and also detects the load current Iout based on the sense current outputted by the semiconductor switch 2 to detect whether the load current Iout becomes the overcurrent. When the microcomputer 11 detects the overcurrent, the microcomputer 11 controls the semiconductor switch 2 to cut off the load current Iout, and protects the wire 4, which supplies current to the load 3, from the overcurrent. When a predetermined period of time elapses and temperature of the wire, which has become high temperature by the overcurrent, is lowered, the microcomputer 11 again turns on the semiconductor switch 2 to supply the load current Iout to the load 3. Thus, the drive of the load 3 based on the supply of the load current Iout starts again.

Figure 2:
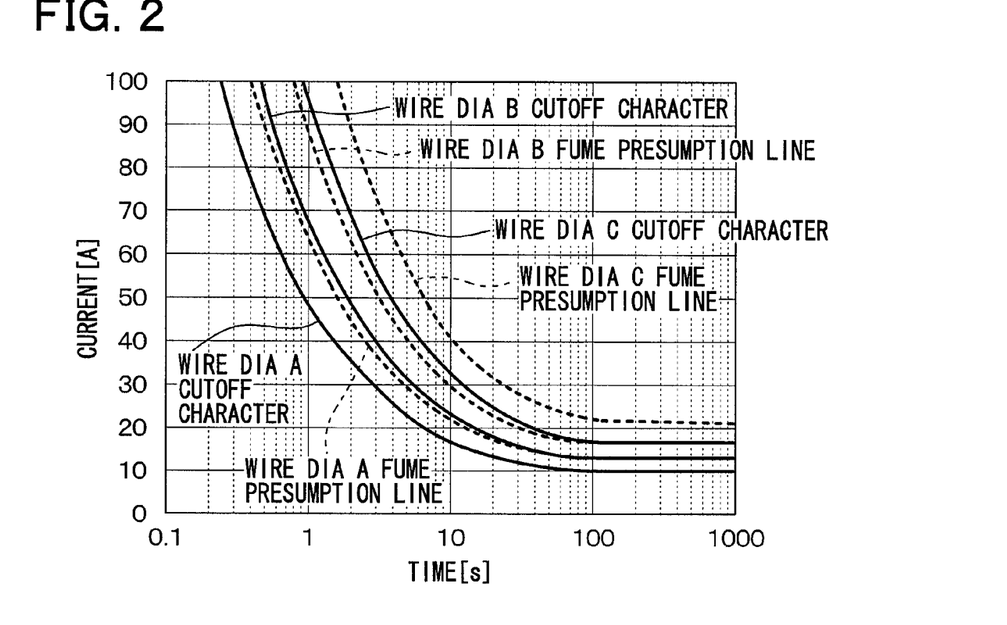
FIG. 2 is a diagram illustrating an example of relation between a wire fume presumption line and a cutoff characteristics based on measured values.

Specifically, the microcomputer 11 stores a cutoff characteristics which is used in turning off the semiconductor switch 2 to cut off the load current Iout for protection of the wire 4. The cutoff characteristics is determined based on a wire fume presumption line that is presumed from material and wire diameter or the like of the wire 4. FIG. 2 illustrates an example of a relation between the wire fume presumption line and the cutoff characteristics based on actual measurement value. Incidentally, FIG. 2 shows several wires 4 having different wire diameters A, B, and C.

As illustrated in FIG. 2, the cutoff characteristics is set with respect to the wire fume presumption line with a predetermined margin, and is set so as to realize a smaller current value than a current at which the wire 4 fumes. The wire 4 fumes in a short time as the current flowing into the wire 4 is larger, and the wire 4 does not fume even for a long time in a case when the current flowing into the wire is small. Thus, the cutoff characteristics is determined according to magnitude of the load current Iout, so that the semiconductor switch 2 is turned off and the load current Iout is cut off at a time which is shorter than a time when it is presumed that the wire 4 fumes.

The cutoff of the load current Iout based on the cutoff characteristics will be explained. The cutoff of the load current Iout is executed by the microcomputer 11 when the integration value exceeds a predetermined determination threshold. The microcomputer 11 adds a predetermined addition value to the integration value or subtracts a predetermined subtraction value from the integration value. After cutting off the load current Iout, the integration value is subtracted according to an elapsed time after cutting off. When the integration value after subtraction is equal to a restart threshold (for example, the integration value is equal to zero), the semiconductor switch 2 is turned on again.

A method of addition and subtraction will be explained below. Basically, the addition value is added to the integration value when it is presumed that the temperature of the wire 4 increases, and the subtraction value is subtracted from the integration value when it is presumed that the temperature of the wire 4 decreases due to stop of the drive of the load 3. Incidentally, a method of the addition and subtraction is described in patent literature 1, for example and the detailed explanation will be omitted. A known various method can be used.

When the semiconductor switch 2 is cut off and the drive of the load 3 is stopped, in a case where the semiconductor switch 2 is cut off due to low voltage of the power supply voltage Vbatt, it may be preferable that the semiconductor switch 2 is turned on and the load 3 is driven again when the power supply voltage Vbatt returns to a high voltage to some extent.

The microcomputer 11 monitors the power supply voltage Vbatt based on the detection result of the voltage detection circuit 7. The microcomputer 11 can detect decrease of the microcomputer power supply voltage or the reference voltage and recovery of the power supply voltage Vbatt to a predetermined voltage or more after decrease.

It should be noticed that the reference voltage fluctuates according to the decrease of the power supply voltage Vbatt. In this case, the microcomputer 11 may falsely recognize the input voltage inputted from the AD converter (an analog-to-digital converter) according to the decrease of the power supply voltage Vbatt, as illustrated in FIG. 10. The microcomputer 11 may not accurately detect voltage when the power supply voltage Vbatt becomes low. The microcomputer 11 stores a threshold voltage for determining the low voltage. The threshold voltage is set within a voltage range (for example, 7.5 V or more) at which the microcomputer 11 can detect voltage accurately in a case where a manufacturing error or the like occurs. Thus the microcomputer 11 can respond to any products. The microcomputer 11 determines as the low voltage when the power supply voltage Vbatt becomes less than the threshold voltage. The microcomputer 11 stores a record that the power supply voltage Vbatt becomes the low voltage.

The microcomputer 11 again turns on the semiconductor switch 2 and restarts the drive of the load 3 when the power supply voltage Vbatt returns to a voltage to some extent, after the power supply voltage Vbatt becomes the low voltage and the integration value of the addition value and the subtraction value exceeds the determination threshold and the load current Iout is cut off. A condition again starting the drive of the load 3 is set to a case where the power supply voltage Vbatt increases to a voltage range (for example, 7.5 V or more) in which the microcomputer 11 can accurately detect voltage.

Since temperature of the wire 4 decreases during the cutoff of the load current Iout, it may be considered that the subtraction value corresponding to temperature decrease in accordance with the elapsed time after the cutoff is subtracted from the integration value before the cutoff and the addition and subtraction may be restart again at the time of restart while using the integration value after the subtraction as a value illustrating temperature of the wire 4. However, when a value obtained by subtracting the subtraction value corresponding to temperature decrease in accordance with the elapsed time after cutting off the load current Iout from the integration value before the cutoff is simply used as the integration value at the time of restart, the above difficulty may occur.

That is, in a case where the rush current occurs when the load 3 is redriven, it is determined to be the overcurrent at the time of occurrence of the rush current and the addition value is integrated. In this case, the addition value at the time of the occurrence of the rush current is added to the integration value corresponding to the temperature decrease of the wire 4, so that the integration value may immediately exceed the determination threshold. In this case, the load 3 is in a state where the load 3 can drive, but the load 3 does not drive.

In order to solve this difficulty, when the load current Iout is cut off due to low voltage of the power supply voltage Vbatt instead of occurrence of the overcurrent, the integration value at the time of restart is corrected. It may be possible to prevent the load current Iout from falsely being cut off at the time of occurrence of the rush current. Specifically, the integration value of the addition and subtraction calculated based on the elapsed time after the cutoff, which is referred to as a pre-correction integration value, is corrected at the time of restart, so that a post-correction integration value is calculated. The post-correcting integration value is smaller than the pre-correction integration value. For example, the post-correction integration value is calculated by multiplying the pre-correction integration value by a correction constant, which is less than one. Alternatively, the post-correction integration value may be calculated by subtracting a predetermined value from the pre-integration value. Herein, the correction constant is equal to ½, and the post-correction integration value is obtained by multiplying the pre-correction integration value by ½. Incidentally, the correction constant is equal to ½ since the addition value added at the time of the occurrence of the rush current does not exceed a half of the determination threshold. It should be noticed that any value is used as long as the addition value or more presumed to be added at the time of the occurrence of the rush current is subtracted from the pre-correction integration value.

Alternatively, the pre-correction integration value may be reset, and the post-correction value may be set to zero. However, in this case, the integration value starts from zero and the addition value is added to the integration value. Therefore, it may take time for the integration value to exceed the determination threshold. Thus, when the load current Iout is cut off due to the occurrence of the overcurrent in actual, the overcurrent again flows at the time of the restart. In this case, it may take time to detect the overcurrent and the wire 4 may not be protected from fume appropriately. In order to prevent this difficulty, instead of setting the post-correction integration value to zero, the post-correction integration value may be calculated to a value decreased from the pre-correction integration value. According to this, in a case where the overcurrent actually flows, it may be possible to detect the overcurrent and cut off the load current Iout again quickly.

Incidentally, when the microcomputer 11 grasps (recognize) a reason the load current Iout is cut off before the restart, it may be possible to set the post-correction integration value more properly. When the power supply voltage Vbatt becomes low voltage, a value of the input voltage inputted by the microcomputer 11 is not detected accurately as illustrated in FIG. 10. Thus, the microcomputer does not grasp a reason that the load current Iout is cut off. In other words, the microcomputer 11 does not determine whether, due to the low voltage of the power supply voltage Vbatt, the overcurrent is falsely detected and the integration value exceeds the determination threshold, or whether the overcurrent actually occurs and the integration value exceeds the determination threshold. Therefore, it may be effective to calculate the post-correction integration value according to the above described method.

In addition, the microcomputer 11 operates based on the microcomputer power supply voltage generated by the power supply circuit 6. When the microcomputer power supply voltage is equal to the microcomputer reset voltage, the microcomputer 11 cannot be operated. In this case, the microcomputer 11 turns off the semiconductor switch 2 to cut off the load current Iout and to stop the drive of the load 3. In addition the microcomputer 11 resets the integration value, which has been added and subtracted before the cutoff. When the microcomputer power supply voltage returns to the microcomputer reset voltage or more, the microcomputer 11 can be operated again. In this case, when the microcomputer power supply voltage further reaches a voltage range in which the microcomputer 11 detects voltage accurately (for example, 7.5 V), the microcomputer 11 turns on the semiconductor switch 2 again and restarts the drive of the load 3.

In this case, while the microcomputer 11 cannot detect voltage accurately due to decrease of the microcomputer power supply voltage, since the microcomputer 11 cannot accurately detect whether the overcurrent occurs or not, the overcurrent may occur actually and the wire 4 may become high temperature. When the semiconductor switch 2 is turned on again, the overcurrent may occur. It should be noticed that the integration value has been reset to zero, as mentioned above. When the integration value is added or subtracted from zero, and when the overcurrent occurs actually, it may take time to detect the overcurrent, so that the wire 4 may not be prevented from fuming properly.

In a case where the microcomputer 11 detects that the power supply voltage Vbatt has decreased, when the microcomputer power supply voltage becomes lower than the microcomputer reset voltage and the microcomputer cannot operate and the integration value is reset, the microcomputer 11 uses a correction value as the integration value in again turning on the semiconductor switch 2. Specifically, a value close to the determination threshold than zero, for example, a half value of the determination threshold is used as the correction value. So that the correction value is used as a new integration value.

As described above, when the microcomputer 11 is returned and turns on the semiconductor switch 2, the microcomputer 11 uses the correction value as the integration value of the addition and subtraction. According to this configuration, when the overcurrent actually flows, it may be possible to detect the overcurrent quickly and cut off the load current Iout quickly.

Incidentally, the correction value is set to a value that the correction value does not exceed the determination threshold even when the addition value corresponding to the rush current is added. The rush current may occur at the time of redrive of the load 3. Thus, it is not determined as the overcurrent by the rush current. Instead, it may be possible to detect the occurrence of the overcurrent appropriately only when the overcurrent actually occurs.

An operation of the overcurrent protection circuit 1 will be explained while comparing with a comparison example.

Figure 3:
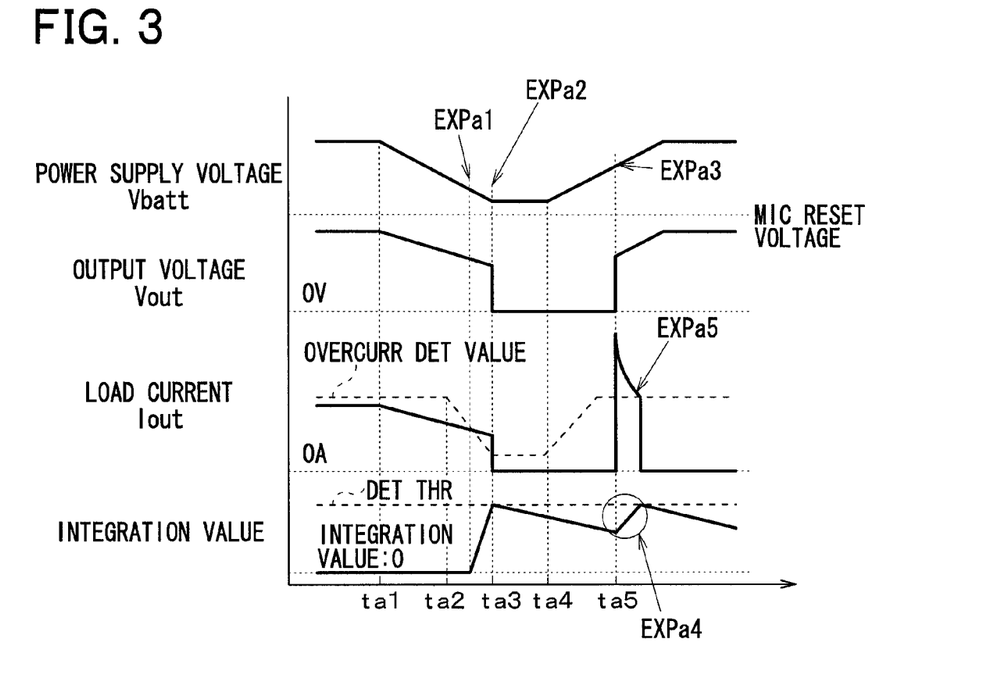
FIG. 3 is a timing chart illustrating a case when an integration value is not corrected in a comparison example.
Figure 4:
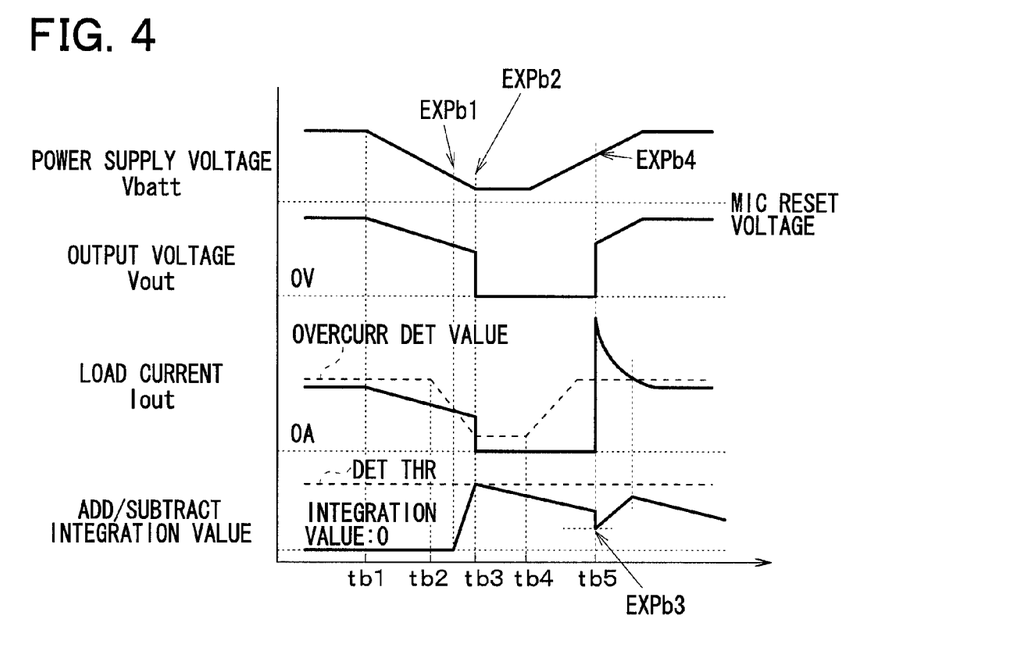
FIG. 4 is a timing chart illustrating a case when an integration value is corrected according to the first embodiment.
Figure 5:
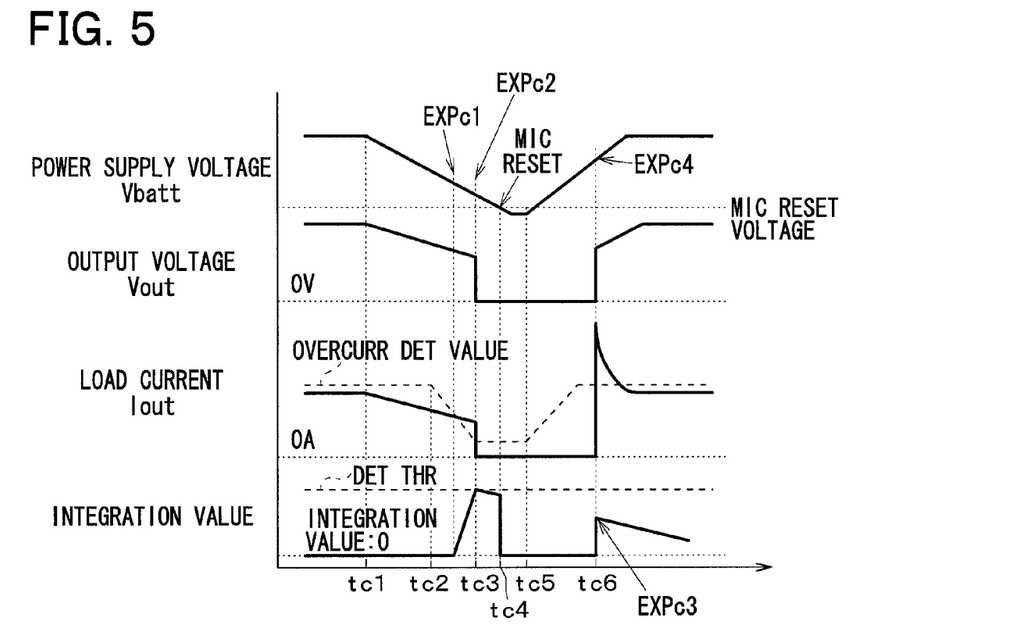
FIG. 5 is a timing chart illustrating a case when the integration value is corrected according to the first embodiment.

FIG. 3 illustrates a comparison example and illustrates a timing chart when the integration value is not corrected. FIG. 4 and FIG. 5 illustrates a timing chart when the integration value is corrected as described in the present disclosure. Specifically, FIG. 3 and FIG. 4 illustrate timing charts in a case where, after the overcurrent has been detected falsely and the load current Iout is cut off due to decrease of the power supply voltage Vbatt, the power supply voltage Vbatt returns and the load current is supplied again. FIG. 5 illustrates the timing chart in a case when, after the microcomputer power supply voltage is less than the microcomputer reset voltage and the microcomputer 11 is reset due to decrease of the power supply voltage Vbatt, the power supply voltage Vbatt returns and the load current Iout is supplied again.

As illustrated in FIG. 3, when the power supply voltage Vbatt decreases from a time ta1, the microcomputer voltage also decreases (not shown). As the power supply voltage Vbatt further decreases, the output voltage Vout that is applied to the load 3 and the load current Iout also decrease. When the power supply voltage Vbatt further decreases, the sense voltage is detected as a greater value than an actual value from a time ta2 due to the decrease of the power supply voltage Vbatt. Thus, the detection accuracy of the overcurrent decreases. A threshold to be an addition target of the addition value in a case where the overcurrent is regarded to be detected is referred to as an overcurrent determination value. For example, when the load current Iout exceeds the overcurrent determination value, the addition value is added. However, since the load current Iout is detected larger than an actual value, the apparent overcurrent determination value decreases as illustrated in FIG. 3. Thus, even when the actual load current Iout should be small, the load current Iout may exceed the overcurrent determination value. When the integration value of the addition value exceeds the determination threshold at a time ta3, the semiconductor switch 2 turns off and the load current Iout is cut off. Incidentally, an EXPa1 in FIG. 3 shows that the overcurrent determination value decreases due to decrease of the power supply voltage. An EXPa2 shows that the output voltage is cut off due to a determination of the overcurrent. An EXPa3 shows that a retry is performed at the time of the recovery of the power supply (7.5 V). An EXPa4 shows that there is a possibility to be cut off falsely due to the rush current. An EXPa5 shows that the cut off is performed falsely due to the rush current.

After that, the power supply voltage Vbatt gradually returns from a time ta4. At a time ta5, the power supply voltage Vbatt reaches a voltage range where the microcomputer 11 can detect voltage accurately (for example, 7.5 V). In this case, the semiconductor switch 2 again turns on, and the load current Iout is transmitted and the load 3 is redriven.

The integration value decreases in accordance with the decrease of the temperature of the wire 4 during a period from the time ta3 to the time ta5, or a period during the load current Iout is not carried. However, when the amount of decrease of the integration value is small as illustrated in FIG. 3, the integration value may quickly exceed the determination threshold due to addition of the addition value by the rush current at the time when the load 3 is redriven, and the load current Iout may be immediately cut off again. Thus, the load current Iout may be falsely cut off due to the rush current, which is not the overcurrent, and the load 3 may stop driving immediately.

On the other hand, when the integration value is corrected as described in the present embodiment, as illustrated in FIG. 4, the microcomputer 11 operates from a time tb1 to tb4 as similar to the operation from the time ta1 to ta4. When the load current Iout is carried again at a time tb5 so as to redrive the load 3, the integration value is corrected. That is, at the time tb5, a pre-correction integration value is multiplied by a correction constant, which is less than one (for example, ½), and the post-correction integration value is calculated. Incidentally, the pre-correction integration value corresponds to an integration value obtained by subtracting the subtraction value according to a time after cutting off the load current Iout. Incidentally, an EXPb1 in FIG. 4 shows that the overcurrent determination value decreases due to decrease of the power supply voltage. An EXPb2 shows that the output voltage is cut off due to a determination of the overcurrent. An EXPb3 shows that a false cutoff at the time of the occurrence of the rush current is prevented due to the correction of the integration value. An EXPb4 shows that a retry is performed at the time of recovery of the power supply (7.5 V).

In this case, the post-correction integration value is decreased to a value estimating the addition value corresponding to the rush current. Thus, the post-correction integration value does not exceed the determination threshold even when the rush current occurs at the time of redrive of the load 3 and the addition value is added. Thus, it may be possible to prevent the load current Iout from being cut off falsely due to the rush current, and may be possible to prevent the load 3 from immediately stopping.

Incidentally, as illustrated in FIG. 2, there is the margin between the cutoff characteristics and the wire fume presumption line. The cutoff characteristics are set to the half of the wire fume presumption line. That is, it is supposed that the wire 4 fumes when current reaches the wire fume presumption line. In this case, the load current Iout is cut off when a time reaches a half of the time. Thus, supposing that the overcurrent is detected from a state where the integration value is equal to zero and the load current Iout is cut off, this time corresponds to a half time of the time when it is presumed that the wire 4 fumes. Therefore, it may be possible to prevent the wire 4 from fuming, when the post-correction integration value is set to a low value while considering the rush current.

In addition, as illustrating in FIG. 5, after performing operations similar to the time ta1 to ta3 in FIG. 3 from a time tc1 to tc3, it is supposed that the power supply voltage Vbatt further decreases at a time tc4. The microcomputer power supply voltage becomes lower than the microcomputer reset voltage. In this case, the microcomputer 11 is reset, and at the same time, the integration value is also reset.

After the time tc4, it is supposed that the power supply voltage Vbatt gradually returns from a time tc5 and the power supply voltage Vbatt reaches the voltage range where the microcomputer 11 accurately detects voltage (for example, 7.5 V). In this case, the semiconductor switch 2 turns on, and the load current Iout is carried to redrive the load 3. In this case, the overcurrent may flow when the load 3 is redriven, instead of the rush current. In this case, when the integrated value remains zero, it may take time to detect the overcurrent. As illustrated in FIG. 5, the present embodiment sets the correction value as the integration value at the time tc6, so that the integration value does not exceed the determination threshold only by adding the addition value corresponding to the rush current. Thus, it may be possible to detect the occurrence of the overcurrent accurately only when the overcurrent occurs, and may be possible to accurately determine the overcurrent. Incidentally, an EXPc1 in FIG. 5 shows that the overcurrent determination value decreases due to decrease of the power supply voltage. An EXPc2 shows that the output voltage is cut off due to a determination of the overcurrent. An EXPc3 shows that a false cutoff at the time of the occurrence of the rush current is prevented due to the correction of the integration value. An EXPc4 shows that a retry is performed at the time of recovery of the power supply (7.5 V).

Figure 6:
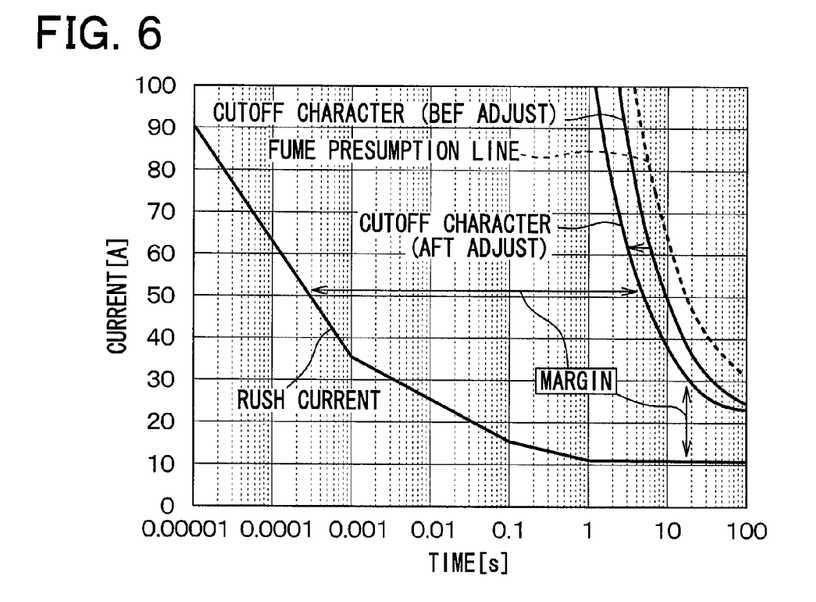
FIG. 6 is a diagram illustrating a relation among the cutoff characteristics with or without correction of the integration value after cutoff of the load current, the fume presumption line, and the rush current.

As illustrated in FIG. 6, the cutoff characteristics at the initial time point when the integration value is not corrected cuts off the load current Iout at the time of the half of the time for the wire fume presumption line. By contrast, when the integration value is corrected as explained above, the cutoff characteristics is changed to another characteristics by which the load current Iout is cut off at the earlier time, so that it may be possible to cut off the load current Iout more quickly. Incidentally, a characteristics of the rush current converges sufficiently shorter than the cutoff characteristics, so that the load current Iout becomes a stationary current. Thus, the cutoff characteristics are set to have enough margins for the rush current and also for the stationary current. Therefore, it may be possible to prevent a false detection of the overcurrent at the time when the rush current occurs.

Although the integration value is set to zero when the microcomputer is reset, the correction value of the integration value is set when the load 3 is restarted. Thus, it may be possible to protect the wire 4 from fuming more surely.

Figure 7:
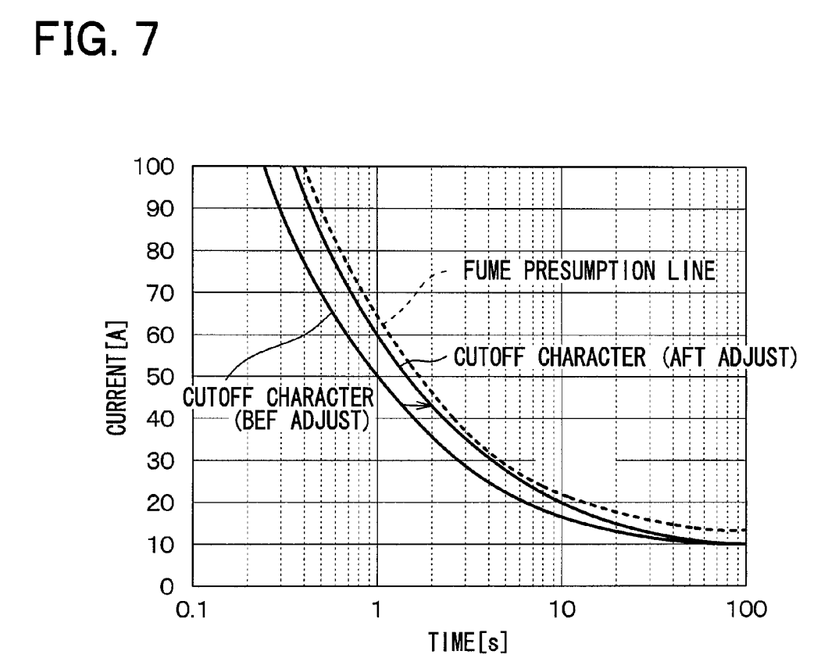
FIG. 7 is a diagram illustrating a relation among the cutoff characteristics with or without correction of the integration value after resetting the microcomputer, and the fuse presumption line.

Thus, before the microcomputer is reset, in a case where the overcurrent occurs and the load current Iout is cut off, a state of the wire 4 may corresponds to a state where a current positioned on a line of the cutoff characteristics before correction as shown in FIG. 7 has been carried for a predetermined period of time. Even in this case, since the integration value is corrected to adjust the cutoff characteristics, the cutoff characteristics after adjustment is adjusted so as to approach the wire fume presumption line from the cutoff characteristics before adjustment. The cutoff characteristics after adjustment have characteristics to cut off the load current Iout for a shorter time than the wire fume presumption line. Therefore, even when the integration is reset to zero, it may be possible to prevent the wire 4 from fuming when the load 3 is redriven and the overcurrent is carried.

Other Embodiment

It should be noticed that the present disclosure is not limited to the described embodiments and can be modified appropriately within a scope of the disclosure.

For example, in the first embodiment, the overcurrent protection circuit 1 is exemplified that drives the load 3 which may produce the rush current. The present disclosure may be applied to another case where a drive of the load 3 without producing the rush current. The load 3 producing the rush current includes, for example, a load L such as a motor. The load 3 without producing the rush current includes, for example, a resistor.

Figure 8A:
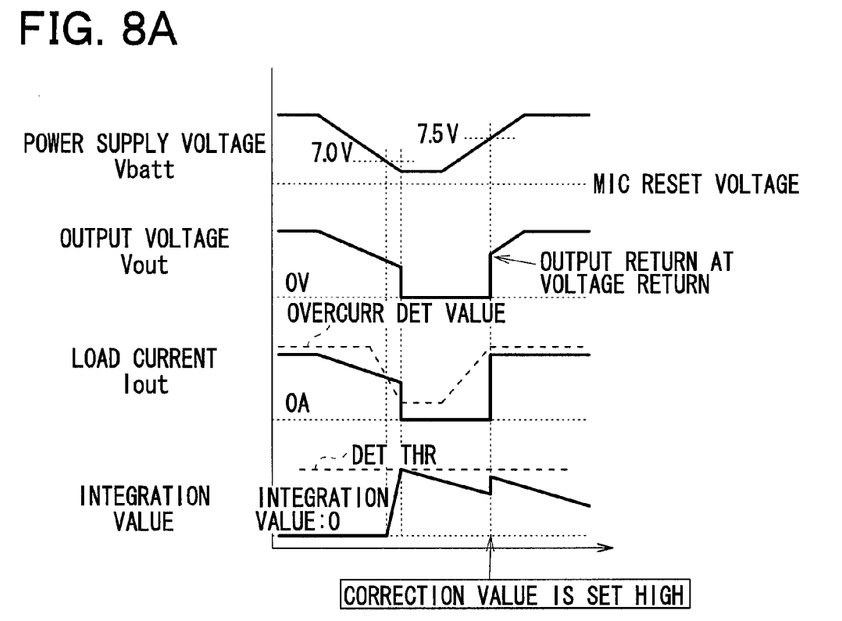
FIG. 8A is a timing chart illustrating a case to set a high value as the post-correction integration value according to another embodiment.

When the load 3 without producing the rush current is used, the integration value may be set to a correction value having a high value so as to approach the determination threshold when the load 3 is redriven again after cutoff, as illustrated in FIG. 8A, since the rush current does not occur. For example, the integration value may be multiplied by a correction constant more or equal to one to calculate a post-correction integration value. Alternatively, the post-correction integration value may be set to a value corresponding to a value obtained by subtracting a predetermined value from the determination threshold. According to this configuration, it may be possible to again cut off the load current Iout more quickly when the overcurrent occurs and the integration value is added. Thus, it may be possible to protect the wire 4 more surely.

Figure 8B:
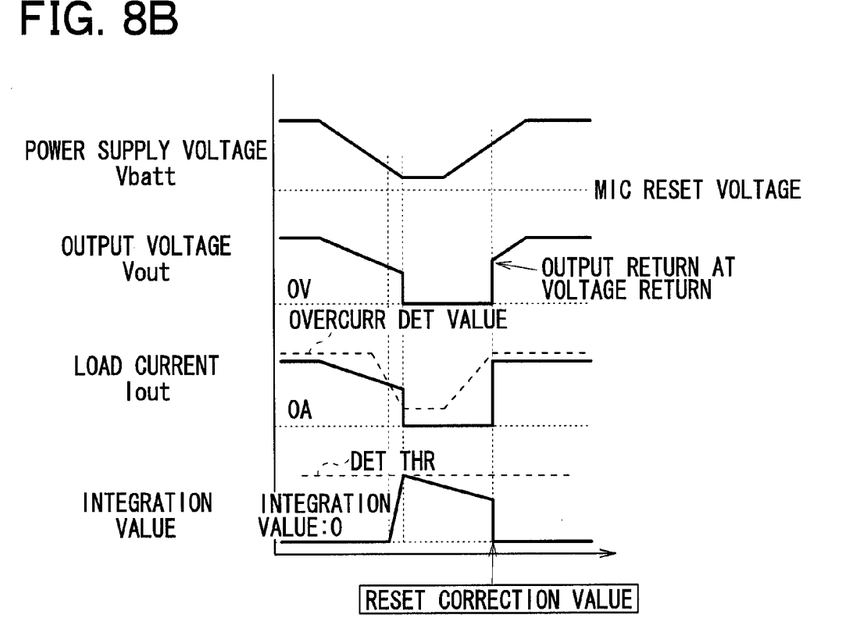
FIG. 8B is a timing chart illustrating a case to set zero as the post-correction integration value according to another embodiment.

It is supposed that the load current Iout may be relatively small in considering the characteristics showing a fume presumption line of the wire 4. In this case, since the load current Iout is small, even when the load 3 is redriven and the load current Iout is carried to the wire 4, it may be possible to prevent the wire 4 from fuming. Thus, as illustrated in FIG. 8B, the integration value may be set to zero when the load 3 is redriven.

In the above embodiments, the power supply circuit 6 and the filter circuit 10 or the like are separately configured from the microcomputer 11. However, each component may be configured together as necessary. That is, it may be unnecessary to separately configure each component. As long as a function as a controller protecting a protection target from an overcurrent is realized, a single component or multiple components can be applied. Incidentally, the function as the controller may include a drive of the load 3, a determination of the addition-and-subtraction value based on the sense voltage, a cutoff of the load current Iout when the integration value obtained by adding the addition value using the addition-and-subtraction value exceeds the determination threshold, and a stop of the drive of the load 3.

In the above embodiments, the protection target is exemplified by the wire 4. However, the protection target is not limited to the wire 4. For example, the overcurrent protection circuit may have a semiconductor switch 2 as the protection target.

Further, in the above embodiments, the post-correction integration value corresponds to a half value of the integration value, which has been subtracted. Instead, the post-correction integration value may be set based on the determination threshold. For example, the post-correction integration value may be a half value of the determination threshold. Alternatively, in a certain case, the pose-correction integration value may be the integration value, which has been subtracted, as it is.

The above embodiments may include a case where the post-correction integration value is set to a half value of the determination threshold or the post-correction integration value is set to zero, when the microcomputer voltage is reduced to the microcomputer reset voltage due to decrease of the power supply voltage Vbatt.

According to another aspect of the present disclosure, for example, the controller may set the post-correction integration value to the half of the pre-correction integration value. When the rush current does not occur in a load, the controller may set the post-correction integration value to zero.

Further according to one aspect of the present disclosure, the controller may set the integration value to zero when the supply voltage is equal to or less than the reset voltage, and in addition, the controller may stop driving the load by cutting off the load current in a case where the controller is driving the load. In addition, when the supply voltage increases to a predetermined voltage or more greater than the reset voltage after setting the integration value to zero, the controller controls the load drive portion to restart drive of the load and sets the integration value to a correction value close to the determination threshold than zero to perform addition and subtraction from the correction value.

According to this configuration, the integration value is set to zero when the controller is reset, and the correction value is set as the integration value when the load is re-driven. Thus, it may be possible to prevent the protection target from receiving overcurrent when the load is redriven. In other words, it may be possible to reduce a period of time when overcurrent flows at the time of redrive of the load.

While the embodiments, the configurations, the aspects of the overcurrent protection circuit have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. An overcurrent protection circuit comprising:
    a load drive portion that drives a load based on a power supply voltage;
    a wire that connects the load and the load drive portion;
    a current detection portion that detects a load current showing a value of a current flowing through the load, and outputs a sense voltage corresponding to the load current;
    a voltage detection portion that detects the power supply voltage; and
    a controller that controls the load drive portion to control a drive of the load, the controller determining an addition-and-subtraction value based on the sense voltage detected by the current detection portion, controlling the load drive portion to cut off the load current when an integration value obtained by adding and subtracting with the addition-and-subtraction value exceeds a determination threshold, and stopping driving the load to protect a protection target from an overcurrent, wherein:
the controller subtracts the integration value based on an elapsed time after cutoff of the load current to obtain a pre-correction integration value when detecting decrease of the power supply voltage and cutting off the load current due to excess of the integration value over the determination threshold;
the controller, when the power supply voltage increases to a predetermined voltage after the power supply voltage decreases, controls the load drive portion to again start to drive the load, and also calculates a post-correction integration value lower than the pre-correction integration value, by correcting the pre-correction integration value; and
the controller adds and subtracts from the post-correction integration value.

2. The overcurrent protection circuit according to claim 1, wherein:
the controller sets the post-correction integration value to a half of the pre-correction integration value.

3. The overcurrent protection circuit according to claim 1, wherein:
the controller sets the post-correction integration value to zero.

4. The overcurrent protection circuit according to claim 1, wherein:
the controller sets the post-correction integration value to a half of the determination threshold.

5. The overcurrent protection circuit according to claim 1, wherein:
the controller includes a case in which the post-correction integration value is set to the integration value after subtraction.

6. The overcurrent protection circuit according to claim 1, wherein:
the controller, when the power supply voltage is equal to or less than a reset voltage, sets the integration value to zero and cuts off the load current in a case where the load is driving to stop driving the load;
the controller, when the power supply voltage increases up to the predetermined voltage greater than the reset voltage after setting the integration value to zero, controls the load drive portion to again start to drive the load, and also sets the integration value to a correction value close to the determination threshold than zero; and
the controller adds and subtracts from the correction value.

7. An overcurrent protection circuit comprising:
a load drive portion that drives a load based on a power supply voltage;
a wire that connects the load and the load drive portion;
a current detection portion that detects a load current showing a value of a current flowing through the load, and outputs a sense voltage corresponding to the load current;
a voltage detection portion that detects the power supply voltage; and
a controller that controls the load drive portion to control a drive of the load, the controller determining an addition-and-subtraction value based on the sense voltage detected by the current detection portion, controlling the load drive portion to cut off the load current when an integration value obtained by adding and subtracting with the addition-and-subtraction value exceeds a determination threshold, and stopping driving the load to protect a protection target from an overcurrent,
wherein:
the controller, when the power supply voltage is equal to or less than a reset voltage, sets the integration value to zero and cuts off the load current in a case where the load is driving to stop driving the load;
the controller, when the power supply voltage increases up to a predetermined voltage greater than the reset voltage after setting the integration value to zero, controls the load drive portion to again start to drive the load, and also sets the integration value to a correction value close to the determination threshold than zero; and
the controller adds and subtracts from the correction value.

8. The overcurrent protection circuit according to claim 7, wherein:
the controller includes a case in which the post-correction integration value is set to zero.

9. The overcurrent protection circuit according to claim 7, wherein:
the controller sets the post-correction integration value to a half of the determination threshold.

10. The overcurrent protection circuit according to claim 6, wherein:
the protection target corresponds to the wire connecting the load and the load drive portion; and
the correction value close to the determination threshold than zero is a half of the determination threshold.

* * * * *